United States Patent [19]

De Voy et al.

[11] 3,792,436

[45] Feb. 12, 1974

[54] DESKEWING BUFFER ARRANGEMENT WHICH INCLUDES MEANS FOR DETECTING AND CORRECTING CHANNEL ERRORS

[75] Inventors: David D. De Voy, Dedham; George J. Barlow, Tewksbury; John A. Klashka, North Andover, all of Mass.

[73] Assignee: Honeywell Information Systems Inc., Waltham, Mass.

[22] Filed: Jan. 4, 1973

[21] Appl. No.: 321,094

[52] U.S. Cl. ............... 340/146.1 F, 340/146.1 BE, 340/174.1 B

[51] Int. Cl. ..... G06k 5/04, G11b 27/36, H03k 5/18

[58] Field of Search ........... 340/146.1 BE, 146.1 F, 174.1 B

[56] References Cited

UNITED STATES PATENTS 3,193,812 7/1965 Friend ......................... 340/174.1 B

*Primary Examiner*—Malcolm A. Morrison

*Assistant Examiner*—R. Stephen Dildine, Jr.

*Attorney, Agent, or Firm*—Faith F. Driscoll et al.

[57] ABSTRACT

A deskewing buffer system includes a plurality of storage registers each of which include a plurality of storage devices. Pairs of the storage devices provide storage for a single information channel. The devices of each channel further includes circuits for detecting when no information has been stored by an input pair of storage devices of a channel within a bit interval which signals a dropped bit within the channel. The detection circuits are then operative to switch both input storage devices of the channel to the same predetermined state. Thereafter, checking circuits coupled to a last register of the buffer system are operative to check the deskewed contents of the register and generate a signal indicating whether the channel dropped a binary ONE or binary ZERO bit. The signal is then used to transfer selectively the state of one of the pairs of storage devices of the channel to an output register.

22 Claims, 6 Drawing Figures

DESKEWING BUFFER ARRANGEMENT WHICH INCLUDES MEANS FOR DETECTING AND CORRECTING CHANNEL ERRORS

BACKGROUND OF THE INVENTION

1. Field of Use

This invention relates to checking circuits and more particularly to error detection and error correction circuits associated with the deskewing buffer apparatus of a magnetic tape system.

2. Prior Art

In general, prior art systems include a plurality of deskewing buffer storage registers, each including two storage elements for deskewing the information bits of a character. One prior art system utilized one storage element which switched state when there was an occurrence of a transition within a data cell interval indicating that a bit of information occurred within that channel. The other storage element was used to detect when there was a nonoccurrence of a transition within a data cell interval indicating that a bit of information was dropped in that channel. In handling the dropped bit occurrences, the prior art system further included another storage element which was operative to switch to a predetermined state only when either one of the two storage elements had previously switched state.

In addition to requiring additional storage means for each channel, the prior art arrangement was found to create timing problems in having the asynchronous channel information signals stored in either of two synchronously operated storage devices at different intervals. More importantly, the arrangement could not reliably detect the occurrence of dropped bits in that during the intervals required for synchronizing the operation of the system, other channels could also drop bits and this could go undetected.

Another prior art arrangement is described in U.S. Pat. No. 3,519,988 titled "Error Checking Arrangement for Data Processing Apparatus", invented by Sherman H. Grossman which issued on July 7, 1970 and is assigned to the assignee of the present invention. The arrangement disclosed in the patent provides for detection of a dropped frame by detecting when a character did not occur within a predetermined interval of time. Since the presence of a character was determined by sensing a bit transition in any one of the channels, the arrangement could no way detect a dropped bit within a given channel.

Accordingly, it is an object of the present invention to provide an improved arrangement which is able to detect and correct for the occurrence of errors within a character or byte.

It is a further object of the present invention to provide a more reliable arrangement for detecting for the presence of errors within a character as it is being deskewed.

It is a more specific object of the present invention to provide for detection and correction of data characters using a minimum of apparatus.

SUMMARY OF THE INVENTION

The above objects are achieved according to the teachings of the present invention by providing apparatus which takes particular advantage of a characteristic of the recorded information being recovered. The characteristic is that each bit interval always includes a pulse signal.

In accordance with the preferred embodiment, each channel of the apparatus used for deskewing the characters or bytes being read from the magnetic medium has a pair of input storage devices. These storage devices are switched to first and second states when a binary ONE or binary ZERO pulse respectively has been sensed during a bit interval. Each channel includes means for detecting when storage devices have not been switched to either a first or second state during the bit interval which is indicative of a dropped bit within the channel. The means is then operative to switch the pair of storage devices to a predetermined state thereby coding the information being deskewed to indicate to the remainder of the system that the channel had dropped a bit.

The arrangement further includes checking means associated with a last register stage of the deskewing apparatus which performs a checking operation upon the channel bits of each deskewed character before it is transferred to an utilization device. The results of the check are then used to correct the "dropped bit" error condition by selectively switching the state of one of the pairs of storage devices of the channel signalling the dropped error condition. In instances where there is more than one drop bit channel error condition associated with a given character, means are provided for indicating this condition as an uncorrectable error.

The above and other objects of this invention are achieved in the preferred embodiment disclosed hereinafter. Novel features which are believed to be characteristic of the invention both as to its organization and method of operation, together with further objects and advantages will be better understood from the following description considered in connection with the accompanying drawings. It is to be expressely understood however, that these drawings are for the purpose of illustration and description only and are not intended as a definition of the limits of the present invention.

DESCRIPTION OF THE PREFERRED EMBODIMENT

Figure 1:
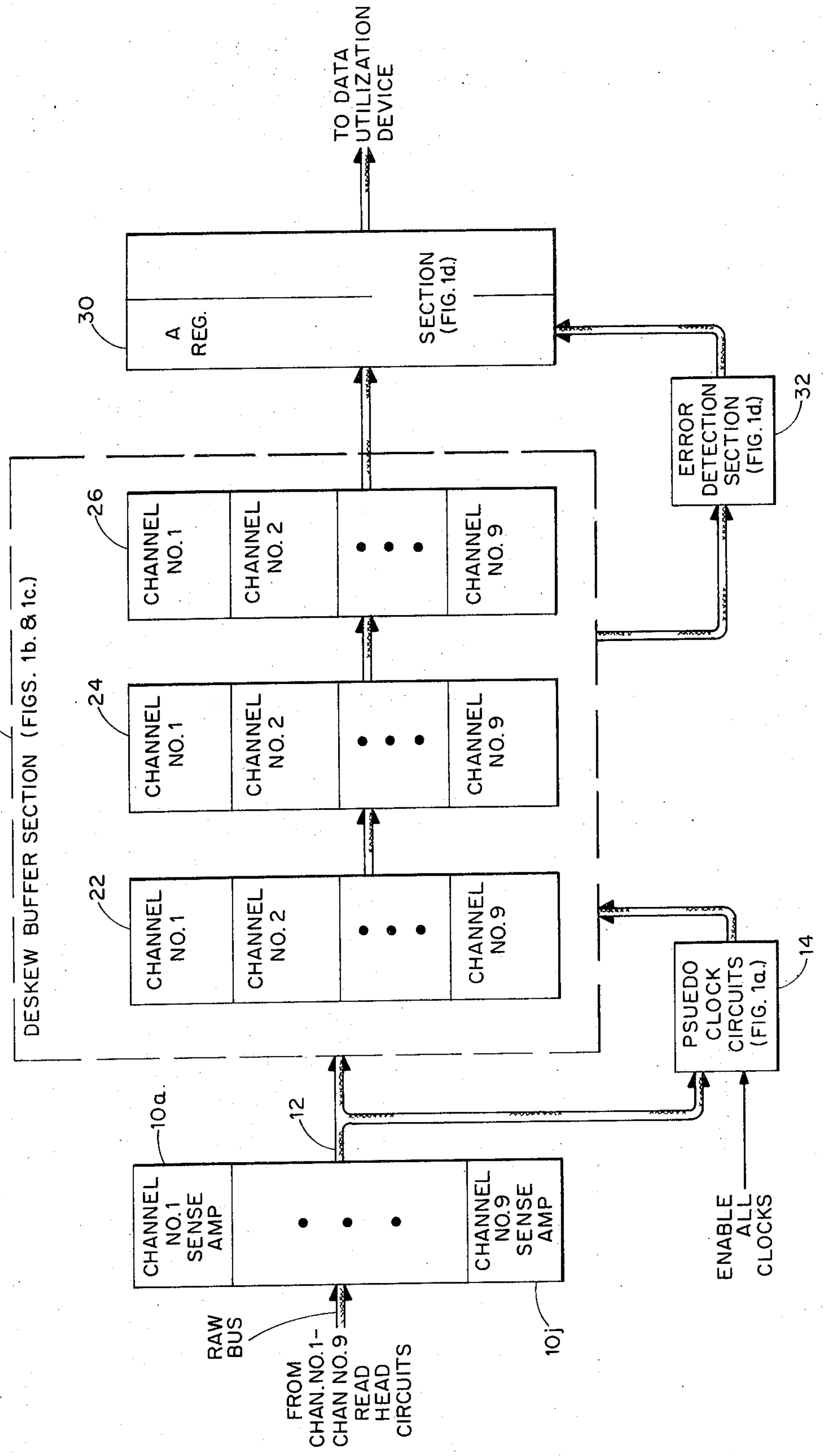
FIG. 1 shows in block diagram form a system which utilizes the detection and error correction apparatus of the present invention.

Referring to first to FIG. 1, there is shown a read section of a magnetic tape system which incorporates the apparatus of the present invention. The system includes a plurality of channel sense amplifier circuits 10*a* through 10*j* each of which are operative to receive phase encoded information signals from a corresponding number of read head circuits, not shown. For the purposes of the present invention, the sense amplifier circuits 10*a* through 10*j* may be considered conventional in design and are operative to provide pulses representative of binary ZEROS and binary ONES. In particular, the sense amplifiers circuits 10*a* through 10*j* are operative to sense positive and negative transitions of phase encoded signals wherein a positive going transition in the middle of a bit cell represents a binary ONE and a negative going transition in the middle of the bit cell represents a binary ZERO. Additionally, the amplifier circuits sense transitions which occur between successive binary ONES and between successive binary ZEROS. The sense amplifier circuits convert the positive and negative transitions into pulses which are applied to a data ONE output terminal and a data ZERO output terminal respectively.

The amplifier circuits of each channel apply via a bus 12 the binary data ONE pulses and binary data ZERO pulses from their output terminals as separate inputs to a different one of the pseudo clock circuits of block 14 and to a pair of storage devices which comprise a first register 22 of the deskew buffer section 20.

Figure 1A:
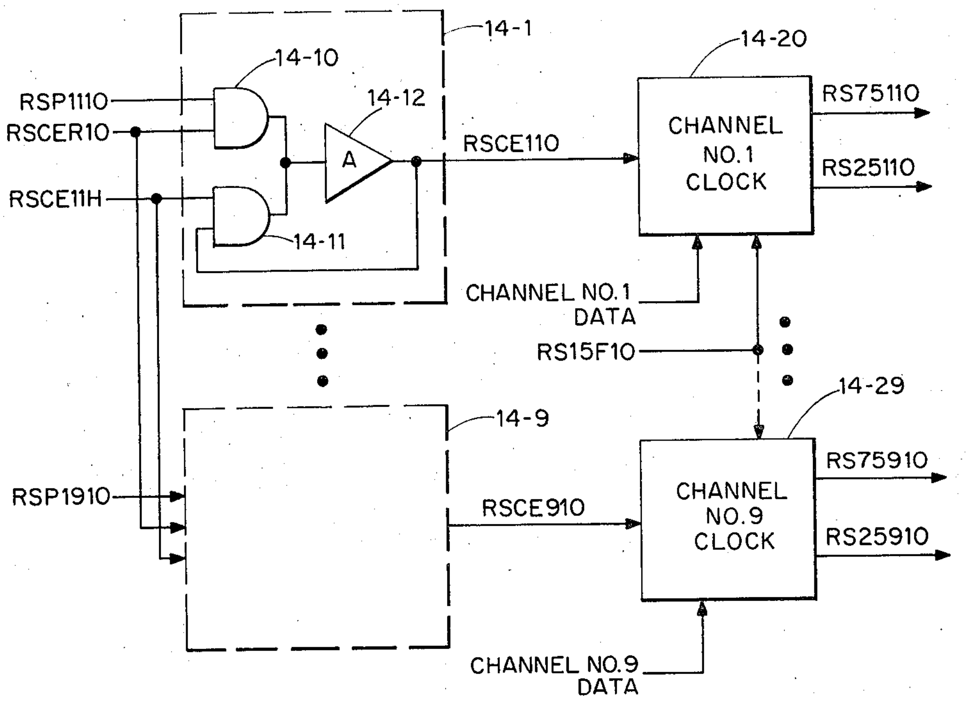
FIG. 1*a* shows in greater detail the pseudo clock circuits and associated circuits of FIG. 1.

The pseudo clock circuits 14 which are shown in blocks 14–20 through 14–29 in FIG. 1a, can for the purposes of this invention be considered conventional in design. Each of the pseudo clock circuits may for example include a voltage controlled oscillator circuit whose frequency is adjusted in accordance with the input data bit rate. Each pseudo clock circuit is operative to provide a set of pulses which define the 25 percent point and 75 percent point of a bit cell interval. The signal RS25110 and signal RS25910 respectively for example define the 25 percent points for the channel 1 and channel 9 buffer circuits. Similarly, signal RS75110 and signal RS75910 respectively define the 75 percent points for the channel 1 and channel 9 buffer circuits.

Each of the pseudo clock circuits are enabled by a corresponding one of the circuits 14–1 through 14–9. Enabling occurs when circuits within the magnetic tape system signal the start of a valid data record which forces signal RSCER10 to a binary ONE state. This signal conditions an AND gate, as for example AND gate 14–10, which switches a corresponding one of the circuits 14–1 through 14–9 to a binary ONE upon receiving a "data one" pulse from a corresponding one of the sense amplifier circuits. The "data one" pulse signals for channel 1 through channel 9 are designated as signals RSP1110 through RSP1910 in FIG. 1*a*.

Each of the circuits 14–1 through 14–9 are held in a binary ONE state via an AND gate such as AND gate 14–11 until reset when a signal RSCE11H goes to a binary ZERO. This occurs with the completion of a read operation. A signal RS15F10 when in a binary ZERO state inhibits each of the pseudo clocks 14–20 through 14–29 from being responsive to pulses from the DATA ONE output terminals when the clock circuits are in the process of being synchronized during an initial portion of a read operation. The reason is that during this initial phase, the sense amplifier circuits only read signals representative of all ZERO characters of a preamble portion of a data record and the pulses at the DATA ONE terminals are phase signals rather than binary ONE data signals. Thus, proper synchronization is guaranteed by having only the data ZERO terminal pulses applied to the pseudo clock circuits during the synchronization phase. After approximately one half of the preamble portion of the data record has been read, signal RS15F10 is switched to a binary ONE which allows the pseudo clock circuits to respond to both sets of pulses. At that time, the pseudo clock circuits will normally be in synchronization.

Deskew Buffer Section 20

Figure 1B:
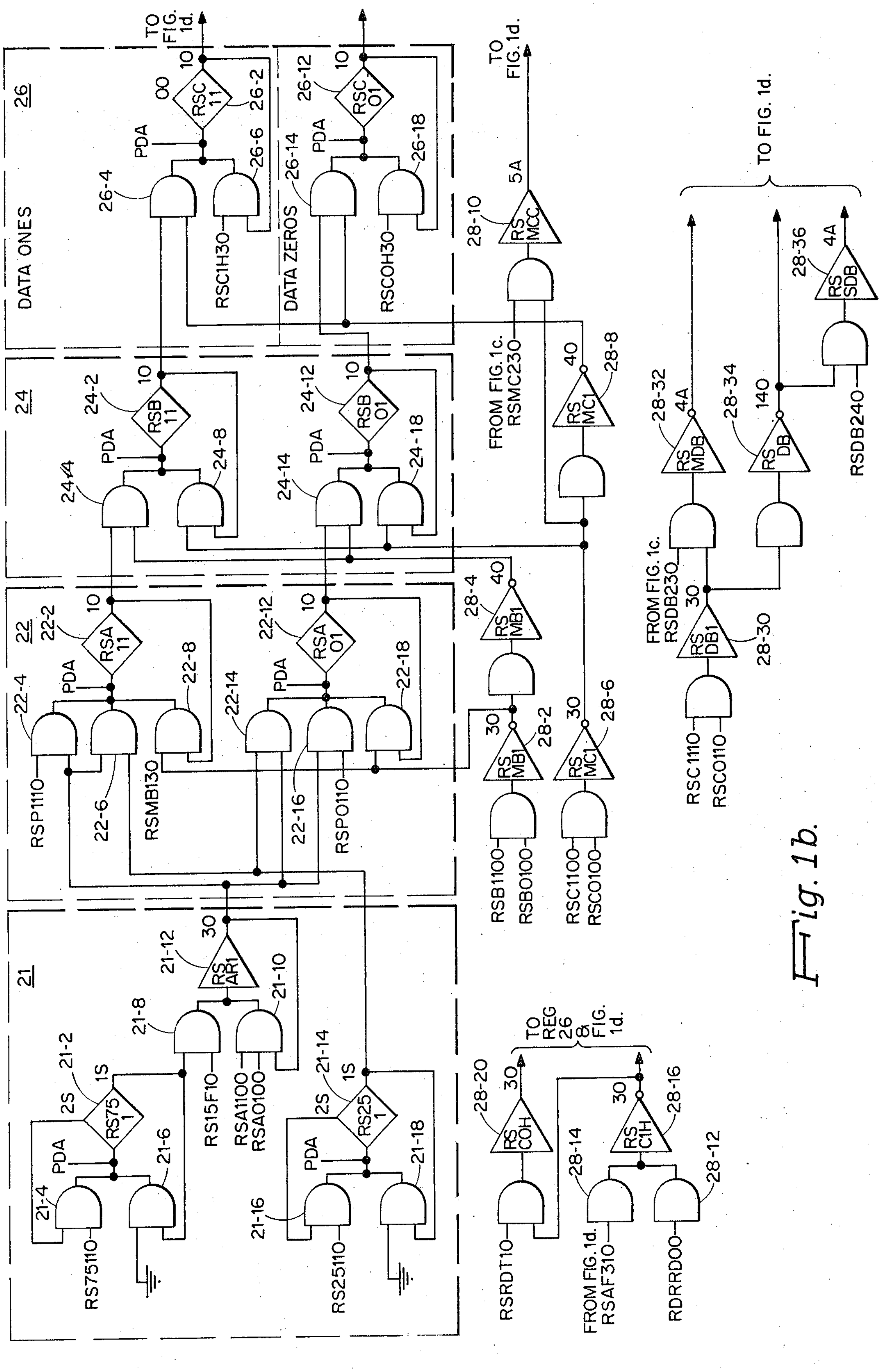
FIG. 1*b* shows in greater detail the storage and associated circuits included in a first information channel of the deskew buffer section of FIG. 1.
Figure 1C:
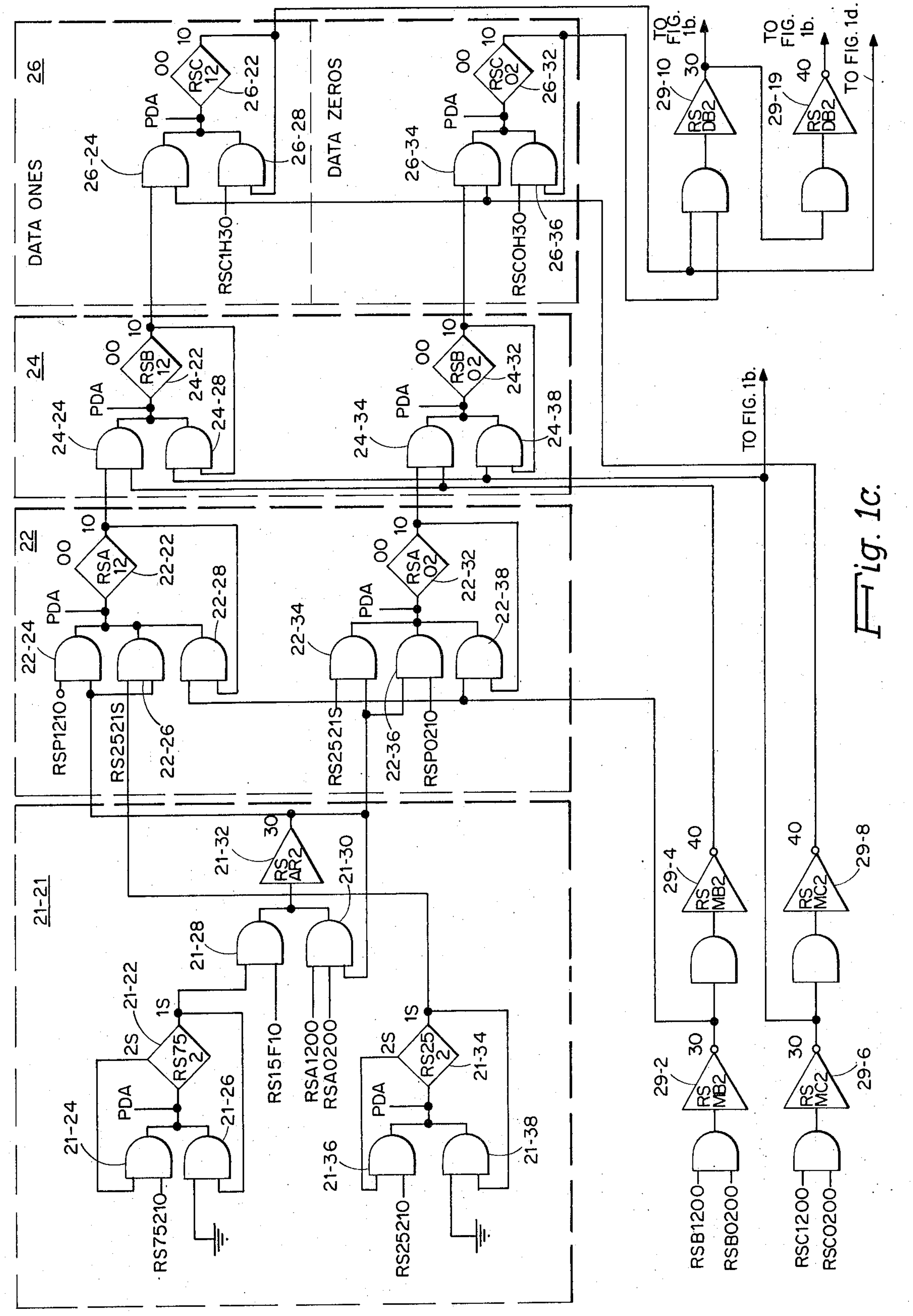
FIG. 1*c* shows in greater detail the storage and associated circuits of a second information channel of the deskew buffer section of FIG. 1.

Referring now to FIGS. 1*b* and 1*c*, it is seen that the clocking signals generated by the corresponding ones of the pseudo clock circuits 14–20 through 14–29 (i.e. channel 1 and channel 2) are applied to a pair of flip-flops included in blocks 21 and 21–21 of their respective buffer channel circuits. Specifically, the clocking signals from the pseudo clock circuits of channel 1 and channel 2 are applied to synchronizing flip-flops 21–2, 21–14, and to flip-flops 21–22 and 21–34. The clocking signals RS75110 and RS75210 respectively are operative to switch flip-flops 21–2 and 21–22 to their binary ONE states in response to a further PDA clocking signal generated by a system clock, not shown. Switching occurs as seen via the AND gates 21–4 and 21–24. These flip-flops are reset to their binary ZERO states in response to PDA clocking signals via corresponding ones of the AND gates 21–6 and 21–26. In a similar fashion, the flip-flops 21–14 and 21–34 are switched to their ONE states via corresponding ones of the gates 21–16 and 21–36 in response to clocking signals RS25110 and RS25210. Also, resetting of these flip-flops to their binary ZERO states occurs via corresponding ones of the AND gates 21–18 and 21–38. The arrangement just described including flip-flops 21–2, 21–4 and flip-flops 21–22 and 21–34 converts the asynchronously arriving clock pulses derived from the magnetic medium into clocking signals synchronized with the system clock.

Only after the pseudo clock circuits have attained synchronization are the clocking signals RS7511S and RS7521S applied to the input pair of flip-flops of their respective buffer channel circuits of register 22. That is, when synchronization has been attained, signal RS15F10 is forced to a binary ONE which permits the AND gates 21–8 and 21–28 to apply signals RS7511S and RS7521S to the storage devices of the register circuits as shown in FIGS. 1*b* and 1*c*. More specifically, signal RS7511S and signal RS7521S respectively are operative to switch a latching circuit including an amplifier 21–12 and a latching circuit including an amplifier 21–32 to a binary ONE state. The latching circuits condition an AND gate 22–4 and an AND gate 22–24 to switch to binary ONES in response to signals RSP1110 and RSP1210. These signals as mentioned are derived from the DATA ONE output terminals of the sense amplifier circuits 10*a* and 10*b* of channels 1 and 2. Accordingly, when a pulse is applied to either of the AND gates 22–4 and 22–24, one of the flip-flops 22–2 and 22–22 will switch to a binary ONE state.

In a similar fashion, an AND gate 22–16 and an AND gate 22–36 are also conditioned by clocking pulse signals RS7511S and RS7521S so as to enable flip-flops 22–12 and 22–32 to be switched to their binary ONE states in response to pulses from the DATA ZERO output terminals of the sense amplifier circuits 10*a* and 10*b*. Thus, it is seen that signals RSAR130 and RSAR230 are operative to gate into the input pairs of storage devices of their respective channels, pulses representative of binary ONE and binary ZERO information.

It is seen from FIGS. 1*b* and 1*c* that as soon as any one of the pairs of storage devices of channel 1 and 2 switches to a binary ONE state, this in turn forces signals RSAR130 and RSAR230 to a binary ZERO. This switching occurs via an AND gate 21–10 and an AND gate 21–30 both which are disabled when either one of the pairs of signals RSA1100, RSA01100 or RSA1200, RSA0200 has been forced to a binary ZERO.

Following the application of pulses RS7511S and RS7521S, the pseudo clock circuits of each channel apply pulses RS25110 and RS25210 to their respective flip-flops. This switches both flip-flop 21–14 and flip-flop 21–34 to a binary ONE state. Accordingly, this applies pulses RS2511S and RS2521S to AND gates 22–6, 22–14, 22–26 and 22–36 as shown. It is important to note that in the event that either one or the signals RSAR130 and RSAR230 are still binary ONES, this causes both flip-flops of the channel to be set to their binary ONE states. That is, if, at the end of a bit interval, neither flip-flops of a channel have been switched to a binary ONE state, this means that a bit of information was lost or dropped and both flip-flops of the channel are set to their binary ONE states.

When the corresponding pairs of flip-flops of a next buffer register are empty or have been cleared, this causes both input flip-flops of a channel to be reset to their binary ZERO states. More specifically, when the flip-flops 24–2 and 24–12 are both binary ZEROS (i.e. signals RSB110 and RSB0200 are binary ONES), this causes an AND and inverter gate 28–2 to switch signal RSMB130 to a binary ZERO which resets the channel one input flip-flops 22–2 and 22–12 to the binary ZERO states. Resetting occurs via AND gates 22–8 and 22–18. At the same time, signal RSMB130 causes a further gate and inverter circuit 28–4 to switch signal RSMB140 to a binary ONE. As seen from FIG. 1*b*, this conditions AND gate 24–4 and AND gate 24–14 to switch their corresponding flip-flops 24–2 and 24–12 to store the information contained in the channel 1 flip-flops 22–2 and 22–12.

In a similar fashion, channel 2 flip-flops 22–22 and 22–32 are reset to their binary ZERO states in response to a signal RSMB230 generated by an AND gate and inverter circuit 29–2 when both the flip-flops 24–22 and 24–32 of register 24 are in their reset state (i.e. signal RSB1200 and RSB0200 are binary ONES). The resetting occurs via an AND gate 22–28 and an AND gate 22–38. At the same time, signal RSMB240 generated by a gate and inverter circuit 29–4 conditions a gate 24–24 and 24–34 to switch corresponding ones of the flip-flops 24–22 and 24–32 to store the information contained in the channel 2 flip-flops of register 22.

A similar transfer of information takes place between the channel storage flip-flops of registers 24 and 26 when the flip-flops of register 26 for that channel are in their binary ZERO states. Specifically, an AND gate and inverter circuit 28-6 forces signal RSMC130 to a binary ZERO when both flip-flops 26–2 and 26–12 are in their binary ZERO states (i.e. signals RCS0100 and RSC0100 are binary ONES). This signal, as seen from FIG. 1*b*, resets flip-flops 24–2 and 24–12 respectively to their binary ZERO states via AND gates 24–8 and 24–18. At the same time, signal RSMC130 causes a further gate and inverter circuit 28–8 to force signal RSMC140 to a binary ONE which loads the contents of flip-flops 24–2 and 24–12 into the channel 1 flip-flops 26–2 and 26–12. The loading takes place via an AND gate 26–4 and AND gate 26–14 in response to PDA clocking signals. Similarly, as seen from FIG. 1*c*, channel 2 flip-flops 24–22 and 24–32 are reset to their binary ZERO states when the channel 2 flip-flops of register 26 are in their binary ZERO states (i.e. signals RSC1200 and RSC0200 are binary ONES). This causes an AND gate and inverter circuit 29–6 to force signal RSMC230 to a binary ZERO. At the same time, a further gate and inverter circuit 29–8 forces signal RSMC240 to a binary ONE which loads or transfers the contents of channel 2 flip-flops 24–22 and 24–32 into the channel 2 flip-flops 26–22 and 26–32 of register 26. The transfer takes place by way of AND gates 26–24 and 26–34.

Normally, during a read operation in the absence of transfers taking place between the storage devices of register 26 and the A register 30 of FIG. 1, hold signals RSC1H30 and RSC0H30 are binary ONES which maintain their corresponding flip-flops such as flip-flops 26–2, 26–22 and 26–12, 26–32 in their binary ONE states. AND gates 26–6, 26–26 and AND gates 26–16, 26–36 perform the holding functions. From FIG. 1*b*, it is seen that signals from gates 28–12 and 28–14 and inverter circuit 28–16 and AND gate and amplifier circuit 28–20 are combined to generate the hold signals RSC1H30 and RCS0H30. Normally, during a read operation, signal RDRRDOO and signal RSRDT10 are in a binary ZERO and in a binary ONE state, respectively. A signal RSAF310 generated by the circuits of FIG. 1*d* is a binary ZERO Unless the A register 30 is being loaded with information stored in register 26.

In addition to the above described circuits, FIG. 1*b* also includes circuits for signalling the remaining circuits of FIG. 1 when both channel 1 and channel 2 storage devices contain information and when either channel has dropped a bit of information. More specifically, an AND gate and amplifier circuit 28–10 is operative to force signal RSMCC5A to a binary ONE when both signals RSMC130 and RSMC230 are binary ONES. It is seen from FIGS. 1*b* and 1*c* that signal RSMC130 is a binary ONE when at least one of the flip-flops of the channel 1 stages of register 26 has been switched to a binary ONE. Similarly, signal RSMC230 from FIG. 1*c* is a binary ONE when at least one of the flip-flops of channel 2 storage register 26 is a binary ONE.

The AND gate and inverter circuits 28–30, 28–32, gate and inverter circuit 28–34 and AND gate and amplifier circuit 28–36 generate those signals which indicate whether channel 1 or channel 2 has dropped a bit of information. It is seen that the AND gate and inverter circuit 28–30 forces signal RSDB130 to a binary ONE when flip-flops 26–2 and 26–12 of channel 1 register 26 are both in their binary ONE states (indicates a dropped bit). Similarly, it is seen from FIG. 1*c* that an AND gate 29–10 forces signal RSDB230 to a binary ONE when both flip-flops 26–22 and 26–32 are binary ONES. Thus, the AND gate and inverter circuit 28–32 is operative to force signal RSMDB4A to a binary ZERO when both channel 1 and channel 2 have each dropped a bit of information. Similarly, the gate and inverter circuit 28–34 is operative to force signal RSMDB140 to a binary ZERO when channel 1 has dropped a bit of information. The AND gate and amplifier circuit 28–36 forces signal RSSDB4A to a binary ONE when neither channel 1 nor channel 2 has dropped a bit of information. All of these signals as seen from FIGS. 1 *b* and 1*c* are forwarded to the other detection circuits and A register of FIG. 1*d*.

Figure 1D:
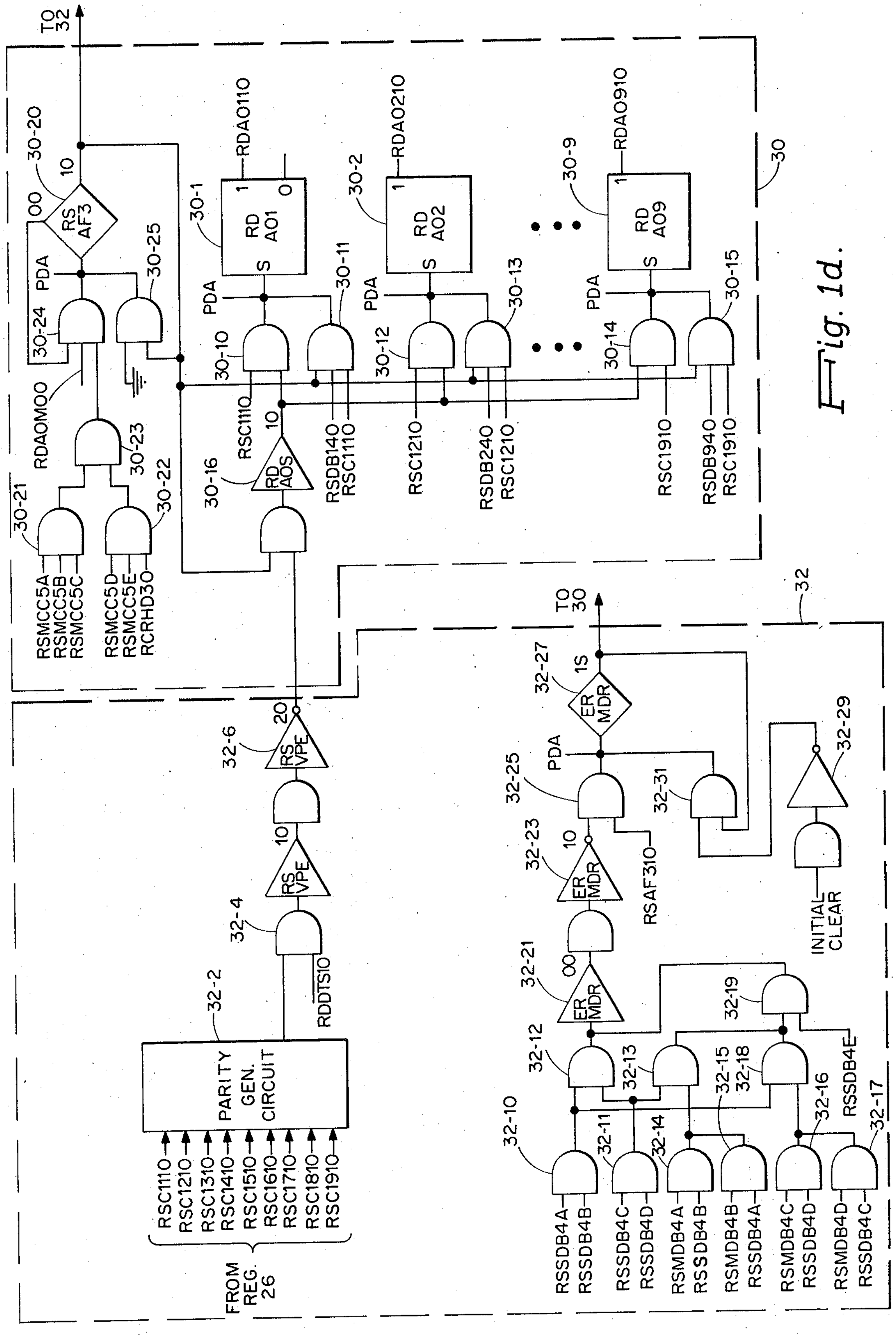
FIG. 1*d* shows in greater detail the circuits of the error correction section and the detection section of FIG. 1.

Error Detection and Error Correction Sections — FIG. 1*d*

Referring now to FIG. 1*d*, it is seen that the section 32 includes a parity generation circuit 32–2 which receives the signals of a character or byte stored in the DATA ONE storage flip-flop of each pair of flip-flops comprising register 26 (e.g. signals RSC1110 through RSC1810) and generates an odd parity bit signal for these signals in a conventional manner. It compares the generated parity signal with the channel 9 DATA ONE output signal RSC1910 and forces an AND gate and amplifier circuit 32–4 to a binary ZERO state when a binary ONE bit had been dropped from one of the nine channels. Conversely, the amplifier circuit 32–4 is forced to a binary ONE state when a binary ZERO bit had been dropped from one of the nine channels.

The character or vertical parity error signal is inverted by a gate inverter circuit 32–6 and applied as an input to the A register 30. The state of signal RSVPE20 which indicates whether a binary ONE or a binary ZERO bit was dropped is used to make the appropriate correction.

The section 32 further includes a plurality of AND circuits 32–10 through 32–19 arranged as shown. The AND circuits receive the "dropped bit" signals generated by the channel circuits and cause an amplifier circuit 32–20 to force signal ERMDROO to a binary ONE when there has been no more than one bit dropped from a byte or character. That is, the AND circuits are operative to detect when the circuits of two or more channels have detected a drop bit. More specifically, AND gate 32–10 generates a binary ONE output signal when there have been no drop bit or error conditions occurring in channels 1 through 4. Similarly, AND gate 32–11 generates a binary ONE output signal when there have been no drop bit occurrences in channels 5 through 8. The output signals from these gates are combined within AND gate 32–12 and force signal ERMDROO to a binary ONE when there have been no drop bit occurrences in channels 1 through 8.

The AND gate 32–14 produces a binary ONE signal when either the channel 1 or 2 circuits detects the occurrence of a drop bit error. Similarly, AND gate 32–15 generates a binary ONE signal when either the channel 3 or channel 4 circuits has detected a drop bit error. The output signals from these gate circuits as well as the output signal from AND gate 32–11 are combined by AND gate 32–13 which produces a binary ONE output signal when any one of first four channels has detected a "drop bit". In a similar fashion, AND gates 32–16, 32–17, and 32–10 condition AND gate 32–18 to generate a binary ONE output signal when there has been a drop bit error in one of the channels 5 through 8.

The AND gate 32–19 is operative to generate a binary ONE signal only when no more than one channel has detected a drop bit error and the last channel circuits have not detected a drop bit error. Accordingly, when there has been more than one drop bit error, amplifier circuit 32–21 is operative to force signal ERMDROO to a binary ZERO which in turn conditions a gate and inverter circuit 32–23 to force a multiple drop bit error signal ERMDR10 to a binary ONE. This signal is applied to a multiple drop bit storage flip-flop 32–27 via an AND gate 32–25. When signal RSAF310 from the A register circuits 30 is forced to a binary ONE, the multiple drop bit storage flip-flop is switched to its binary ONE state. The signal ERMDR1S generated by the flip-flop is forwarded to error storage circuits not shown. The flip-flop 32–27 is reset to its binary ZERO state via a gate and inverter circuit 32–29 and an AND gate circuit 32–31. The resetting occurs in response to a clear signal being applied to the gate and inverter circuit 32–29.

As seen from FIG. 1*d*, the A register circuits 30 include a plurality of flip-flops 30–1 through 30–9 which are operative to store the "deskewed character" assembled in register 26. This character or byte is then transferred from the A register 30 to the remainder of the system for forwarding to the central processing unit.

In the preferred embodiment, the input AND gating circuits of each of the A register flip-flops perform the correction for dropped bit errors. Each of these gating circuits are arranged to be responsive to control signals from the circuits of a particular channel indicating a drop bit occurrence and are operative to condition the A register flip-flop to load a corrected version of the information from the DATA ONE flip-flop of register 26 for that channel in accordance with the state of the parity error signal RSVPE20. More specifically, each flip-flop of register 30 includes a pair of AND gate circuits such as circuits 30–10 through 30–15 arranged as shown. Each of the pairs of AND gate circuits receive a signal from corresponding one of the DATA ONE flip-flops of register 26. A first one of the gate circuits such as gate circuit 30–10 receives a signal RDAOS10 when signal RSVPE20 is a binary ONE upon the deskewed byte or character having been assembled in register 26 (i.e. signal RSAF310 is a binary ONE). This last mentioned signal is generated by flip-flop 30–20 when at least one of each of the pairs of flip-flops of each channel has been switched to a binary ONE state (i.e. signals RSMCC5A through RSMCC5E are binary ONES) during a read operation (i.e. signal RCRHD30 is a binary ONE) when signal RDAM000 is a binary ONE. THis signal is normally a binary ONE except when the register 26 stores an "all ones" character which is inhibited from being transferred to the remainder of the system. The switching of flip-flop 30–20 proceeds via AND gates 30–21 through 30–24 in response to a PDA clocking signal. The flip-flop 30–20 is reset in response to a subsequent PDA clocking signal via an AND gate 30–25.

When signal RDAOS10 is forced to a binary ONE, it conditions a first one of the input AND gates of each channel such as gate 30–10, to load its associated flip-flop 30–1 with the information stored in its DATA ONE flip-flop. For example, if the channel 1 DATA ONE flip-flop stored a binary ONE, signal RSC1110 is operative to condition AND gate 30–10 to switch flip-flop 30–1 to a binary ONE. If, on the other hand, the channel 1 DATA ONE flip-flop is storing a binary ZERO, flip-flop 30–1 would remain a binary ZERO (i.e. signal RSC1110 is a binary ZERO).

When the parity error signal is a binary ZERO, AND gate 32–4 forces signal RSVPE20 to a binary ONE and this signal transfers the binary ONE signal stored in the DATA ONE channel flip-flop to each of the channels signalling a dropped bit into the flip-flops of the register 30 associated therewith. When the parity error signal RSVPE10 is a binary ONE, signal RSVPE20 is a binary ZERO and inhibits the transfer of the binary ONE stored in each of the DATA ONE channel flip-flops which signaled a "dropped bit".

A second one of the pair of AND gates of each A register state is operative to the transfer of the contents of the DATA ONE channel register 26 flip-flops which have not dropped a bit of information. For example, in the event that a bit has been dropped from channel 1, the channel 1 circuits force signal RSDB140 to a binary ZERO state which inhibits the switching of flip-flop 30–1 to a binary ONE when signal RSC1110 is a binary ONE. However, where the dropped bit error had been detected in channel 2 rather than channel 1, the channel 1 circuits force signal RSDB140 to a binary ONE which enables AND gate 30–11 to switch flip-flop 30–1 in accordance with the state of signal RSC1110. Of course, the AND gate 30–13 would be operative to inhibit flip-flop 30–2 from switching to a binary ONE since it was this cahnnel that had the dropped bit error.

DESCRIPTION OF OPERATION OF THE PREFERRED EMBODIMENT

With reference to FIGS. 1, 1*a* through 1*d* and 2, the operation of the preferred embodiment of the present invention will be now be described.

Figure 2:
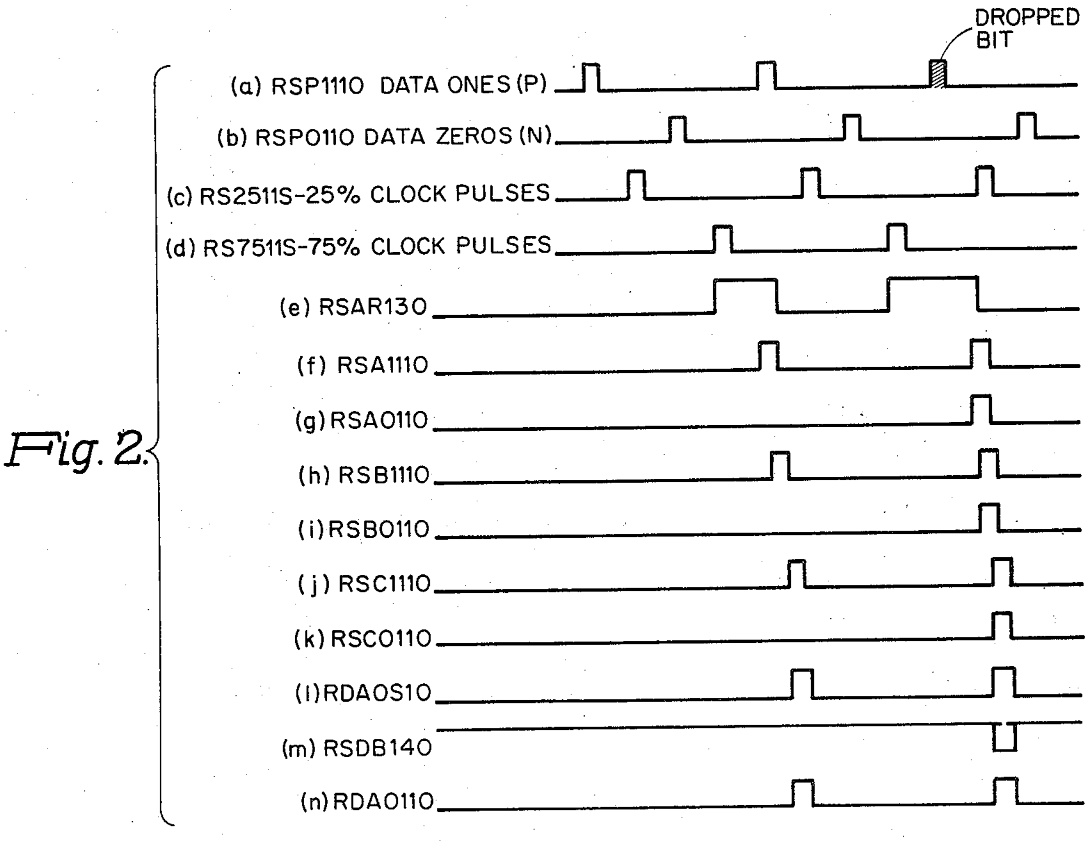
FIG. 2 shows several waveforms used in explaining the operation of the present invention.

Referring to FIG. 2, there is shown the various signals generated by the circuits of FIG. 1*a* through FIG. 1d when the system is processing information bits for channel 1. In accordance with the waveforms shown, it is assumed that the channel 1 circuits are operative to process two binary ONE bits of information and then the next binary ONE bit of information is dropped as indicated by FIG. 2. Under these circumstances, the sense amplifier circuit 10*a* of FIG. 1 is operative to generate at its DATA ONE output terminal the pulses of waveform a designated as signal RSP1110. Additionally, the sense amplifier circuit 10*a* generates at its DATA ZERO output terminal the pulses of waveform *b* designated as signal RSP0110. These last pulses constitute phase information bits since it is assumed that the information being sensed constitutes at least two binary ONES which are recorded as positive going transitions the phase bit separating the binary ONES appear as negative going transitions.

During each bit interval, the pseudo clock circuit 14–20 for channel 1 is operative to produce the timing pulse signals RS2511S and RS7511S which correspond to waveforms *c* and *d* of FIG. 2. The pulse signal RS7511S is operative to switch the amplifier circuit 21–12 of FIG. 1*b* to a binary ONE which forces signal RSAR130 to a binary ONE. This signal defines the start of the bit interval during which information will be read and any pulses occurring within the bit interval are operative to switch one of the input channel 1 flip-flops 22–2 and 22–12 to a binary ONE state.

It is assumed that the first information bit being processed corresponds to the second pulse in waveform a. Thus, signal RSAR130 conditions only flip-flop 22–2 to switch to its binary ONE state upon the occurrence of this pulse as illustrated by waveforms *f* and *g* of FIG. 2. The contents of the channel 1 flip-flops 22–2 and 22–12 are transferred to the next pair of channel 1 flip-flops 24–2 and 24–12 as illustrated by waveforms *h* and *i* of FIG. 2. A clock pulse later, the contents of flip-flops 24–2 and 24–12 are transferred into the last pair of channel 1 flip-flops 26–2 and 26–12 as illustrated by waveforms *j* and *k* of FIG. 2.

When at least one of the flip-flops of each of the pairs of storage devices of all nine channels of register 26 has been switched to a binary ONE Indicating that a complete character has been assembled in register 26, the contents of each of the DATA ONE flip-flops of register 26 are transferred into the flip-flops 30–1 through 30–9 of register 30. That is, when all of the bits of a character have been lined up in register 26, the flip-flop 30–22 of FIG. 1*d* is operative to force signal RSAF310 to a binary ONE. When this occurs, the result of comparing the signal generated by parity generation circuit 31–2 for the assembled character with the parity signal of channel 9 switches signal RSVPE20 to either a binary ONE or a binary ZERO. Assuming no error condition (i.e. signal RSVPE20 is a binary ONE), this causes the AND gate and amplifier circuit 16 to switch signal RDAOS10 to a binary ONE as indicated by waveform 1 of FIG. 2. Since no drop bit occurrence was detected by the channel 1 circuits of FIG. 1*b*, signal RSDB140 is also a binary ONE. The flip-flop 30–1 of the A register 30 is switched to a binary ONE by signal RSC1110. It will also be appreciated that even in the event that an error was detected in another channel which caused signal RSVPE20 to be forced to a binary ZERO, the AND gate 30–11 of FIG. 1*d* in response to signals RSDB140 and RSC1110 is operative to switch flip-flop 30–1 to a binary ONE. This means that the A register flip-flop 30–1 associated with channel 1 is still loaded with the contents of the DATA ONE channel 1 flip-flop as indicated by waveform *h* of FIG. 2 because of no occurrence of a dropped bit within the channel.

It will be noted from waveform *f* of FIG. 2 that following the switching of flip-flop 22–2 of FIG. 1*b*, amplifier 21–12 is operative to switch signal RSAR130 to a binary ZERO. This is effective to inhibit the flip-flops 22–2 and 22–12 of channel 1 from being set by other pulses during the bit interval thereby guaranteeing that the correct information has been stored within the channel 1 flip-flops.

The channel 1 circuits now begin the processing of the "dropped bit" occurrence in waveform *a*. It will be noted that in the instance of a dropped bit occurrence in channel 1, signal RSAR130 is again forced to a binary ONE in response to clocking signal pulse RS7511S. However, because of the absence of a pulse occurring within the bit interval defined by the signals RS7511S and RS2511S, both flip-flops 22–2 and 22–12 remain in their binary ZERO states and signal RSAR130 remains a binary ONE as illustrated by waveform *e* of FIG. 2. Thus, upon the occurrence of pulse RS2511S, AND gates 22–26 and 22–34 are operative to switch both the flip-flops 22–2 and 22–12 to their binary ONE states indicating the occurrence of a drop bit in channel 1. Waveforms *f* and *g* illustrate the foregoing. In the manner described above, the binary ONES stored in flip-flops 22–2 and 22–12 are transferred through the corresponding ones of the channel 1 storage flip-flops of registers 24 and 26 as illustrated by waveforms *h* through *k*.

Referring to FIG. 1*b*, it is seen that the result of comparing the generated parity signal for the second assembled character with the parity signal from a specified one of the tape channels (e.g. channel 9) causes signal RSVPE20 to be forced to a binary ONE. Signal RSVPE20 is a binary ONE because both flip-flops of register 26 for that channel store binary ONES due to the occurrence of a "dropped bit" which was coded into the channel flip-flops of register 22. This in turn, causes AND gate and amplifier circuit 30–16 to switch signal RDAOS10 to a binary ONE as illustrated by the second pulse of waveform 1 of FIG. 2. It will also be noted from FIG. 1*b* that the binary ONE signals (i.e. RSC1100 and RSC0100) stored in the channel 1 flip-flops 26–2 and 26–12 cause the gate and inverter circuit 28–30 to force signal RSDB140 to a binary ZERO as illustrated by the second pulse in waveform *m* of FIG. 2. This signal inhibits AND gate 30–11 of FIG. 1*d* from switching flip-flop 30–1 to a binary ONE in response to signal RSC1110 and allows the appropriate correction to be made by AND gate 30–10. This is illustrated by the second pulse of waveform *e* of FIG. 2. Thus, the occurrence of a dropped binary ONE bit causes the binary ONE stored in the channel 1 flip-flops of register 26 to be transferred to flip-flop 30–1.

A dropped binary ZERO bit will produce the opposite result. That is, signal RSVPE20 will be forced to a binary ZERO indicating that a binary ZERO bit was dropped from the character assembled in register 26. This in turn inhibits AND gate and amplifier circuit 30–10 from switching signal RDAOS10 to a binary ONE. Also, binary ONE signals RSC1100 and RSC0100 cause gate and inverter circuit 28–30 to force signal RSDB140 to a binary ZERO. The signals RDAOS10 and RSDB140 inhibit the transfer of a binary ONE to flip-flop 30–1.

Assuming that only channel 1 has dropped a bit, this causes amplifier 32–21 to force the nonmultiple drop bit signal ERMDR00 to a binary ONE which maintains flip-flop 32–27 in a binary ZERO state. In the event that more than one bit was dropped within the second character assembled, this would cause the amplifier circuit 32–21 to switch signal ERMDR00 to a binary ZERO which in turn cause flip-flop 32–27 to be switched to a binary ONE. The binary ONE signal produced by flip-flop 32–27 would be then forwarded to the remaining circuitry within the section signalling that an uncorrectable error condition was encountered. It is seen that even though the assembled character may have been corrected, the multiple drop bit error signal still indicates to the remaining portion of the system that the character could be in error because more than one bit has been dropped.

From the foregoing, it is seen that the present invention provides means of detecting the occurrence of drop bits from information recorded on a magnetic medium using phase encoding techniques. The present invention, by taking advantage of the fact that a loss of bits will always manifest itself as an absence of pulses within a specified interval, the invention is able to store an indication of this error condition utilizing the storage flip-flops normally provided in the system for storage of information.

In accordance with the invention, the results of a checking operation performed upon the bits of a character is used to determine the nature of the correction required. In the preferred embodiment, an error signal indicates that a binary ZERO has been dropped and the absence of an error signal indicates that a binary ONE has been dropped. Here, the character check presupposes that there must be an odd number of ONES (odd parity is used). Accordingly, the error signal is used to transfer selectively a binary ONE stored in the previous stage into the output stage associated therewith. It can be seen by forcing the input flip-flops of the channel to a predetermined state coding the occurrence of a "drop bit" condition, very little additional apparatus is required to provide the necessary error detection and correction for drop bits.

It will be appreciated by those skilled in the art that many changes may be made to the embodiment illustrated without departing from the spirit and scope of the present invention. For example, the same coding arrangement can also be used to detect errors in phase as well as for drop bits since both types of errors will manifest themselves in the same way.

While in accordance with the provisions and statutes there has been illustrated and described the best form of the invention known, certain changes may be made without departing from the spirit of the invention as set forth in the appended claims and that in some cases, certain features of the invention may be used to advantage without a corresponding use of other features.

Having described the invention, what is claimed as new and novel and for which it is desired to secure Letters Patent is:

1. Apparatus for detecting and correcting for the occurrence of dropped pulses from information pulses of bytes of information read during bit intervals from any one of a plurality of information channels of a storage medium by a corresponding number of sense circuits, the sense circuit of each channel being operative to provide pulses to first and second output lines, said pulses applied to said first line representing a binary ONE and said pulses applied to said second line representing a binary ZERO, each sense circuit providing normally at least one pulse during each bit interval and each byte of information corresponding to a group of bit signals simultaneously recorded on said medium in each of said information channels, said apparatus comprising:

a plurality of deskewing buffer registers, each of said registers including first and second bistable storage means coupled to be individually associated with one of said sense circuits;

said first and second bistable storage means for a first one of said buffer registers of each channel being coupled to receive pulses applied to said first and second lines respectively;

means for applying first and second sets of synchronous clocking signals defining each bit interval to said first and second bistable storage means of said first one of said buffer registers of each channel, said first and second bistable storage means being conditioned by said first set of clocking signals to switch from a binary ZERO to a binary ONE gate in response to pulses applied from said first and second lines respectively;

logic sensing means individually coupled to said first and second bistable means of said first register of each channel, said sensing means being conditioned by said first and second bistable means when in said binary ZERO states to switch both said first and second bistable means to a binary ONE state in response to one of said clocking signals of said second set to signal an occurrence of a dropped pulse within said channel;

checking means coupled to a last one of said buffer registers, said checking means being operative to perform a vertical check upon the contents of each of said first bistable means of each channel corresponding to an assembled byte of information, said checking means being operative in accordance with the results of said vertical check to generate an error correction signal signalling that information stored in said first bistable means of the channel signalling said occurrence of said dropped pulse requires correction; and, logic gating means coupled to said first bistable means of said last one of said buffer registers of each channel, the logic gating means of said channel signalling said occurrence of said dropped pulse being conditioned by said signal to transfer selectively the contents of said first bistable means correcting a corresponding one of the bit position of said assembled byte.

2. The apparatus of claim 1 further including:

gating means coupled to said first and second bistable storage means of said last one of said registers of each channel, said gating means being operative to generate a signal indicating said occurrence of a dropped pulse within said channel when said first and second bistable storage means are both in a binary ONE state; and, a multistage data register for receiving said assembled byte signals, each stage of said data register including a pair of input gating means, one of said pair being coupled individually to one of said first bistable means of said last one of said registers of a channel and to said checking means, the other one of said pair being coupled to said first bistable means and to the sensing means of said channel, said other one of said gating means being conditioned by said signal from said gating means to inhibit the transfer of the contents of said first bistable means and said other one of said gating means being conditioned by said error signal to transfer selectively said contents of said first bistable means.

3. The apparatus of claim 2 wherein each of said pair of input gating means includes an AND gate.

4. The apparatus of claim 1 further including first and second synchronous bistable storage elements coupled to receive first and second sets of asynchronous clocking signals respectively, each of said first and second bistable elements including means for receiving synchronous clocking signals, said first and second bistable elements being conditioned by said synchronous clocking signals to switch from a first to a second state in response to said sets of asynchronous clocking signals to produce said synchronous clocking signals.

5. The apparatus of claim 1 wherein said logic sensing means includes bistate switching means, said bistate switching means being operative in response to said first set of synchronous clocking signals to switch from a first to a second state, and said bistate switching means being operative in response to one of said first and second bistable means being switched to a binary ONE to switch to a binary ZERO.

6. The apparatus of claim 1 wherein said checking means includes:

parity generation means, said parity generation means being operative to generate odd parity check signal for said assembled byte; and, gating means coupled to said parity generation means, said gating means being conditioned by said check signal to force said error correction signal to a binary ONE and a binary ZERO respectively when said channel dropped a pulse representative of a binary ONE and a binary ZERO.

7. The apparatus of claim 1 wherein said first and second bistable storage means of said first one of said registers each include;

first and second gating means, said first gating means of said first bistable storage means being coupled to said first line and coupled to receive said first set of clocking signals, said first gating means of said second bistable storage means being coupled to said second line and coupled to receive said first set of clocking signals, said seocnd gating means of said first and second bistable means each being coupled to receive said second set of clocking signals and coupled to said logic sensing means, and first gating means of said first and second bistable means being operative to switch a corresponding one of said bistable means to a binary ONE state in response to said pulses and said second gating means of said first and second bistable means being conditioned by said logic sensing means to switch said first and second bistable means to said binary ONE state.

8. The apparatus of claim 1 wherein said first and second bistable storage means of each of said registers are coupled to receive clocking signals and wherein said first one of said registers includes gating means connected between any two registers for switching to a binary ONE state said bistable storage means of a succeeding register in response to the bistable storage means of a preceding register being switched to a binary ONE and said bistable storage means of said succeeding register being a binary ZERO upon the occurrence of one of said clocking signals thereby enabling synchronous transfers of information between each of said registers.

9. The apparatus of claim 1 further including multiple error sensing means coupled to said first and second bistable means of said last one of said registers of each channel, said multiple error sensing means being operative to generate an output signal upon sensing that more than one pair of said first and second bistable means is in a binary ONE state.

10. In a multichannel record recovery system apparatus for detecting and correcting for the occurrence of dropped pulses from information pulses of bytes of information read during bit intervals by a plurality of sense circuits from any one of the information channels of a magnetic medium subject to skew a predetermined maximum number of bit positions, the sense circuit of each channel being operative to provide pulses to first and second output lines respectively representative of binary ONE and binary ZERO data and at least one pulse during each bit interval, said system having a predetermined number of deskew registers for accommodating said skew, each of said registers including first and second bistable means individually associated with each of said sense circuits for receiving pulses from said first and second output lines, said apparatus comprising:

means for applying first and second sets of synchronous sets of clocking signals defining each bit interval to said first and second bistable means of a first one of said registers of each channel, each of said first and second bistable means being coupled to said first and second output lines respectively and conditioned by said clocking signals to switch from a first state to second and third states in response to pulses applied to said lines;

sensing means individually coupled to said first and second bistable means of said first one of said registers of each channel, said sensing means being conditioned by said first and second bistable means when in said first state to switch both of said first and second bistable means to a fourth state at the end of a bit interval in response to one of said clocking signals of said second set signalling an occurrence of a dropped pulse within said channel;

checking means coupled to predetermined ones of said first and second bistable means of a last one of said registers of each channel, said checking means being operative to perform a vertical check upon the bits of a byte assembled in said last one of said registers, said checking means being operative in accordance with the results of said check to generate one level of a bilevel output signal indicating that the channel signalling said occurrence, dropped a pulse representative of a binary ONE or a binary ZERO; and, logic gating means coupled to receive signals from said first bistable means of said last one of said registers of each channel, said logic gating means of said channel signalling said occurrence being conditioned by said one level of said bilevel output signal to transfer selectively the contents of said first bistable means so as to correct the information of a corresponding one of the bit positions of said assembled byte.

11. The system of claim 10 wherein said apparatus further includes:

gating means coupled to said first and second bistable storage means of said last one of said registers of each channel, said gating means being conditioned to generate an error signal indicating said occurrence of a dropped pulse within said channel when said first and second bistable storage means have been switched to said fourth state; and, a multistage data register for receiving said assembled byte signals, each state of said data register including a pair of input gating means, one of said pair being coupled individually to one of said first bistable means of said last one of said registers of a channel and to said checking means, the other one of said pair being coupled to said first bistable means and to the sensing means of said channel, said other one of said gating means being conditioned by said signal from said gating means to inhibit the transfer of the contents of said first bistable means and said other one of said gating means being conditioned by said error signal to transfer selectively said contents of said first bistable means.

12. The system of claim 11 wherein each of said pair of input gating means includes an AND gate.

13. The system of claim 10 wherein said apparatus further includes first and second synchronous bistable storage elements coupled to receive first and second sets of asynchronous clocking signals respectively, each of said first and second bistable elements including means for receiving synchronous clocking signals, said first and second bistable elements being conditioned by said synchronous clocking signals to switch from a first to a second state in response to said sets of asynchronous clocking signals to produce said synchronous clocking signals.

14. The system of claim 10 wherein said logic sensing means includes bistate switching means, said bistate switching means being operative in response to said first set of synchronous clocking signals to switch from a first to a second state and said bistable switching means being operative in response to one of said first and second bistable means being switched to a binary ONE to switch to a binary ZERO.

15. The system of claim 10 wherein said checking means includes:

parity generation means, said parity generation means being operative to generate an odd parity check signal for said assembled byte; and, gating means coupled to said parity generation means, said gating means being conditioned by said check signal to force said error correction signal to a binary ONE and a binary ZERO respectively when said channel dropped a pulse representative of a binary ONE and a binary ZERO.

16. The system of claim 15 wherein said apparatus further includes:

means for generating a signal indicating when said last one of said registers stores an assembled byte, said means being coupled to each of said first and second bistable means of said last one of said registers of each channel, said means being operative to generate said signal when at least one of said first and second bistable means of each channel has switched to a binary ONE state; and, gating means coupled to said last mentioned means and to said parity generation means, said gating means being operative in response to said signal and said check signal to generate said error correction signal.

17. The system of claim 10 wherein said first and second bistable means when switched to said first state, said second state, said third state and said fourth state respectively store information codes of 00, 10, 01 and 11.

18. A data recovery system for reliably processing information recorded within a plurality of channels as a series of transitions occurring within a corresponding number of bit intervals, at least one transition occurring within each bit interval, said system comprising:

a plurality of deskewing buffer register means for accommodating a skew of a predetermined maximum number of bit positions, each of said register means including a pair of bistable storage means, each pair of a first one of said register means being individually associated with one of said channels for receiving pulses representative of binary ONE and binary ZERO data defined by said transitions;

means for applying first and second sets of clocking signals defining said bit intervals to first and second bistable storage means respectively of each pair of said first one of said register means for switching said pair from a first state to second and third states in response to pulses received during said intervals;

logic sensing means individually coupled to each pair of bistable storage means of said first one of said register means, said sensing means being conditioned by said each pair when in said first state at the end of a bit interval to switch said pair to a fourth state in response to one of said clocking signals of said second set signalling to the remaining system of an occurrence of a dropped pulse within said channel; and, checking means coupled to predetermined ones of each pair of bistable storage means of a last one of said register means, said checking means being operative to perform a vertical check upon the bits of a byte assembled in said last one of said register means, said checking means being operative in accordance with the results to generate an output signal indicating that the information stored in said pair of bistable storage means of a channel signalling said occurrence of said dropped pulse requires correction.

19. The system of claim 18 further including:

register means having a plurality of stages for receiving said assembled byte signals; and, logic gating means coupled to receive signals from first bistable means of each pair of said last one of said register means, said logic means of each said channel signalling said occurrence, being conditioned by said output signal to inhibit the transfer of information stored in said first bistable means to a corresponding one of said stages, correcting said information.

20. The system of claim 18 wherein said first and second bistable means of said pair when switched to said first state, said second state, said third state and said fourth state respectively store information codes of 00, 10, 01 and 11.

21. The system of claim 18 further including:

gating means coupled to said first and second bistable storage means of said last one of said registers of each channel, said gating means being operative to generate a signal indicating said occurrence of a dropped pulse within said channel when said first and second bistable storage means are both in a binary ONE state; and, a multistage data register for receiving said assembled byte signals, each stage of said data register including a pair of input gating means, one of said pair being coupled individually to one of said first bistable means of said last one of said registers of a channel and to said checking means, the other one of said pair being coupled to said first bistable means and to the sensing means of said channel, said other one of said gating means being conditioned by said signal from said gating means to inhibit the transfer of the contents of said first bistable means and said other one of said gating means being conditioned by said error signal to transfer selectively said contents of said first bistable means.

22. The system of claim 18 further including first and second synchronous bistable storage elements coupled to receive first and second sets of asynchronous clocking signals respectively, each of said first and second bistable elements including means for receiving synchronous clocking signals, said first and second bistable elements being conditioned by said synchronous clocking signals to switch from a first to a second state in response to said sets of asynchronous clocking signals to produce said synchronous clocking signals.

* * * * *